(No Model.) 3 Sheets—Sheet 1.
F. T. ZIMMERMAN.
WINDMILL.
No. 418,859. Patented Jan. 7, 1890.
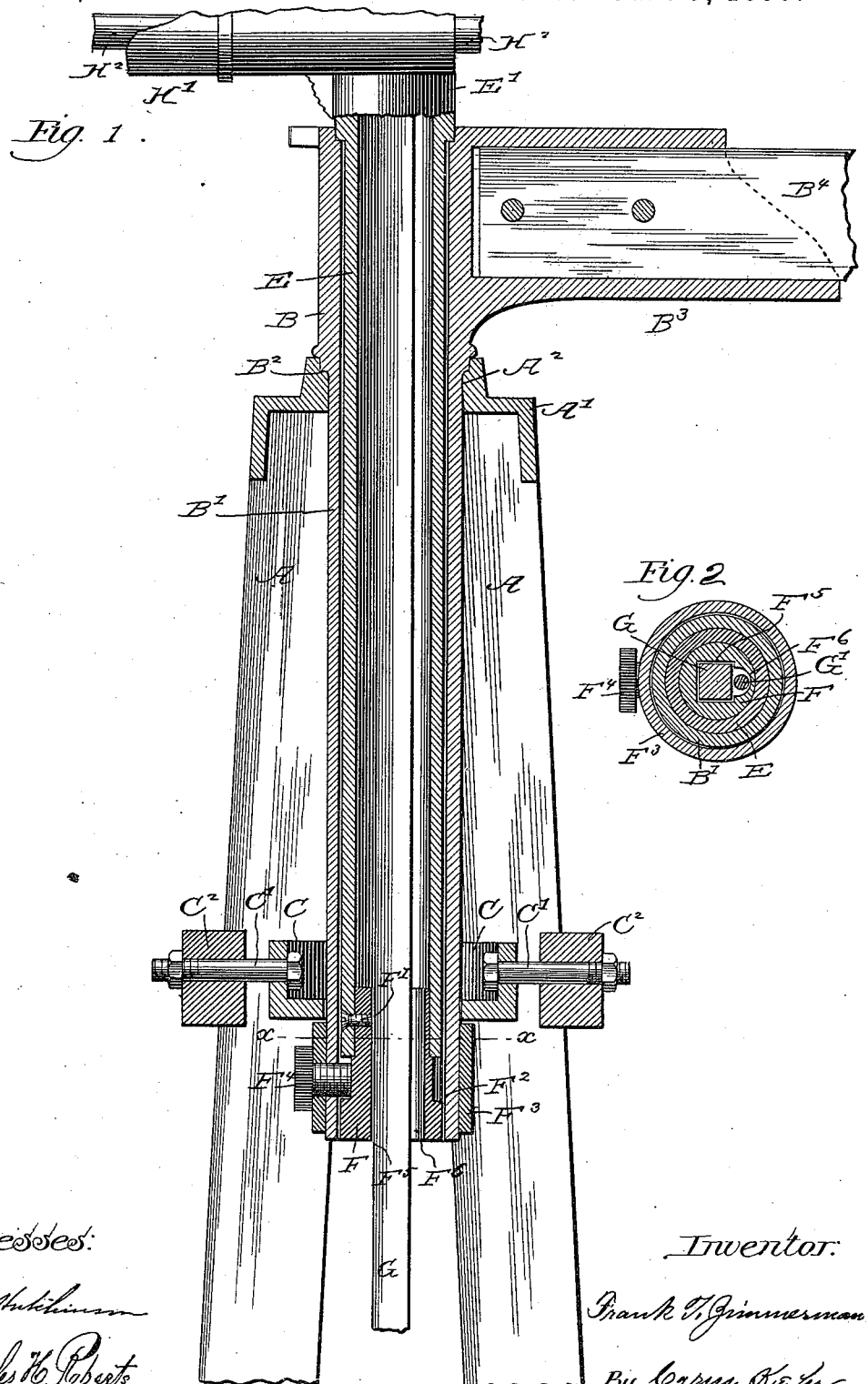
Witnesses:
Inventor:
Frank T. Zimmerman
By Cyrus Kehr
Attorney (No Model.) 3 Sheets—Sheet 2.
F. T. ZIMMERMAN.
WINDMILL.
No. 418,859. Patented Jan. 7, 1890.
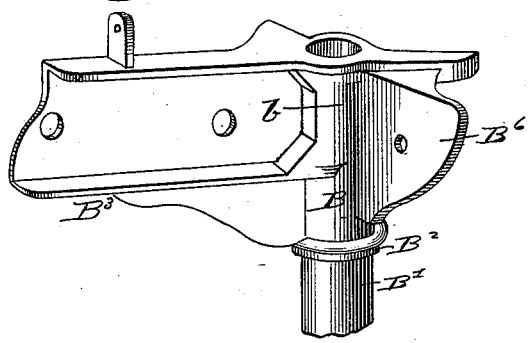
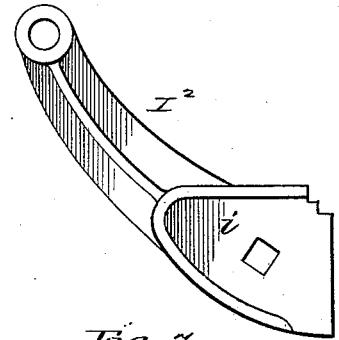
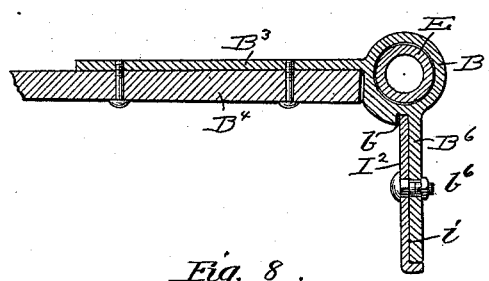
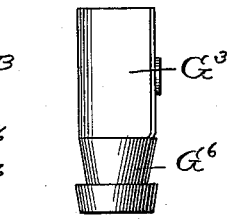
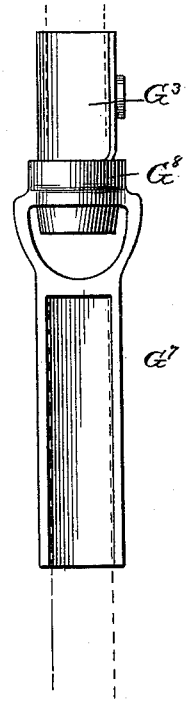
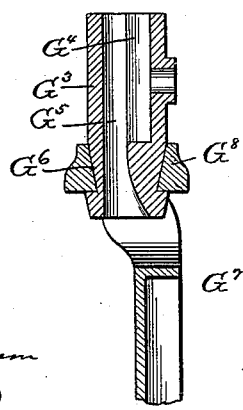
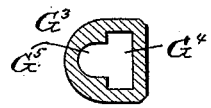
Witnesses:
P. W. Hutchinson
Charles N. Roberts
Inventor:
Frank T. Zimmerman
By Cyrus Kehr,
Attorney.
N. PETERS, Photo-Lithographer, Washington, D. C.

(No Model.) 3 Sheets—Sheet 3.
F. T. ZIMMERMAN.
WINDMILL.
No. 418,859. Patented Jan. 7, 1890.
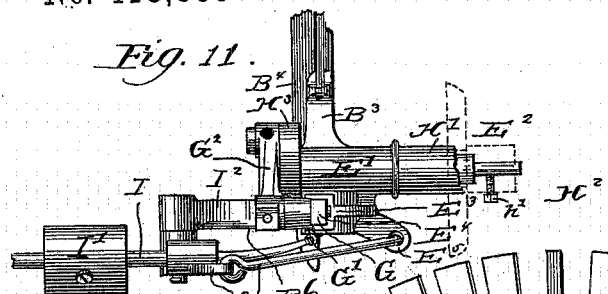
Fig. 11.
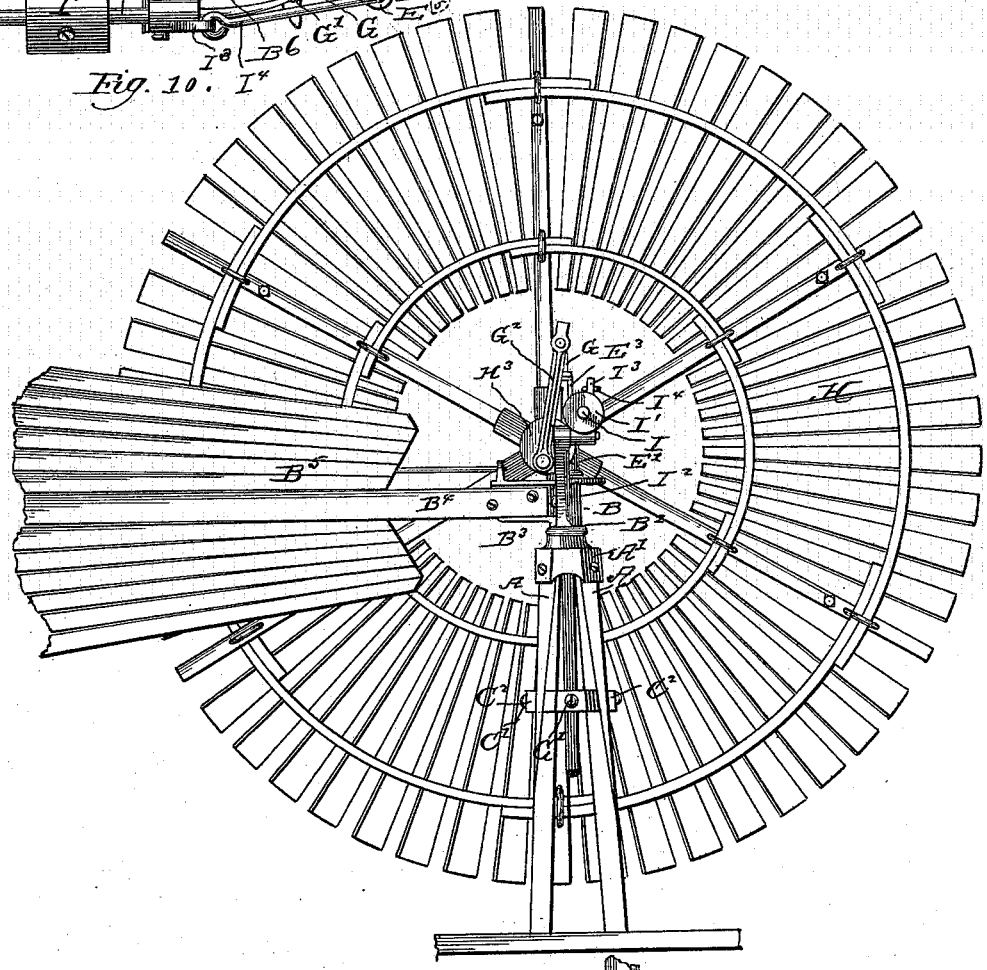
Fig. 10.
Fig. 12.
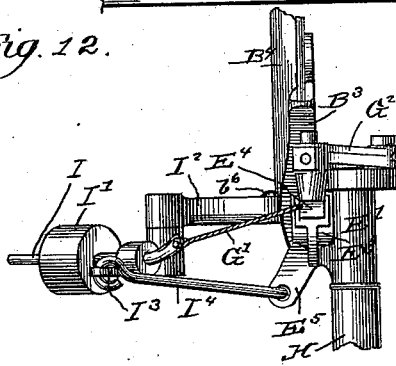
Witnesses:
P. M. Hutchinson
Charles H. Roberts
Inventor:
Frank T. Zimmerman
by Cyrus Kehr
Atty.

UNITED STATES PATENT OFFICE.

FRANK T. ZIMMERMAN, OF AUBURN, INDIANA.

WINDMILL.

SPECIFICATION forming part of Letters Patent No. 418,859, dated January 7, 1890.

Application filed October 1, 1888. Serial No. 286,907. (No model.)

*To all whom it may concern:*

Be it known that I, FRANK T. ZIMMERMAN, a citizen of the United States, residing at Auburn, in the county of De Kalb and State of Indiana, have invented certain new and useful Improvements in Windmills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The improvement which I describe herein relates to the general construction of windmills.

In the accompanying drawings, Figure 1 is a vertical section of the parts supporting the wheel. Fig. 2 is a section in $x$ $x$ of Fig. 1. Fig. 3 is a perspective of the turn-table. Fig. 4 is a detail of the standard for supporting the weighted governing-arm. Fig. 5 is a horizontal section through the turn-table. Figs. 6, 7, 8, and 9 are details of the joint in the pump-rod. Fig. 10 is an elevation of the mill. Figs. 11 and 12 are plans of the mechanism located above and around the turn-table.

Referring to Figs. 1 and 10, A A are the uprights of the tower of the mill.

A' is a metallic cap seated over the upper ends of the uprights A and having through its center a hole $A^2$ of sufficient size to receive the tube B' of the turn-table B. Upon the upper end of said tube B' there is formed an annular shoulder $B^2$, made so large that it cannot pass through but must rest upon said cap A'. In this manner said turn-table is supported upon said cap and the tower. Near its lower end said tube is surrounded by a closely-fitting ring C, from which adjusting-bolts C' extend outwardly through the blocks $C^2$ on the tower. By means of said bolts and ring the lower end of said tube may be drawn laterally to set it in a vertical position.

The parts thus far specified have been previously used, and are so well known to those familiar to this art that I deem it unnecessary to describe them in detail.

$B^3$ designates a horizontal extension of the turn-table, to which is bolted the inner end of the mid-rib $B^4$ of the tail-vane $B^5$. At right angles to the extension $B^3$ is another extension $B^6$, standing in a vertical plane and having a vertical face in a plane at right angles to the extension $B^3$, to which face the standard $I^2$ is secured.

E is the wheel-tube. This is of proper diameter to fit loosely into the turn-table B, and is of such length as to extend almost to the lower end of the latter, while above it has the head E' and the spindle $E^2$, said head being so large as to rest upon and not pass through the turn-table, and said spindle being at one side of the vertical axis of said tube E.

A tubular plug F is fitted into the lower end of the wheel-tube E, and secured in such position by a countersunk screw or rivet F'. Said plug is extended below the wheel-tube and expanded to form an annular hip $F^2$. A ring $F^3$ is fitted around the tube B' against the ring C. A screw-bolt $F^4$ extends through the ring $F^3$ and tube B' into the annular space between the hip $F^2$ and the lower end of the wheel-tube E, by which means the ring $F^3$ is secured to the tube B', so that said tube cannot rise through the ring C, and the inner end of the bolt $F^4$ impinges against the hip $F^2$ and prevents the wheel-tube E and head E' from rising. Thus both tubes are held against forced vertical movement in response to the strains of irregular blasts of air during storms. The bore $F^5$ of said plug F is preferably rectangular in cross-section, with an extension $F^6$ at one side, the rectangular portion being of proper size to admit the pump-rod G and the extension being of proper size to admit the governing cord or wire G'. The spindle $E^2$ is hollow and of proper external diameter to receive the hub H' of the wheel H. $H^2$ is the wheel-shaft, extending through said hub and spindle and having upon its inner end the crank-wheel $H^3$. The bore of the outer end of the hub H' is contracted so as to fit upon said wheel-shaft, and is secured thereto by means of a set-bolt h' or otherwise.

From the head E' rises a standard $E^3$, the upper end of which is bent so as to stand over the vertical axis of the tube E, and supports a vertical guideway $E^4$ in line with said axis. The pump-rod G extends upwardly through said guideway, and a pitman-rod $G^2$ is connected by its upper end to the upper end of said pump-rod and by its lower end to said crank-wheel $H^3$, so that when said crank-wheel is rotated said pump-rod will be reciprocated.

The wheel H is set out of the wind by turning it laterally until it stands parallel to the tail-vane. Since the spindle $E^2$ is set at one side of the vertical axis of the tube E, the pressure of the wind upon the wind-wheel tends to turn the latter toward the tail-vane. It is therefore necessary to adopt means for automatically resisting this tendency. This is accomplished by means of a weighted governing-arm of the kind familiar to the art. Only the details of said governing-arm as hereinafter claimed are my invention. I is such arm, located opposite the spindle $E^2$, and I' is a weight located upon the outer portion of said arm. Said arm is pivoted near its inner end upon the upper end of a standard $I^2$, supported from the turn-table so as to oscillate in a vertical plane. The tendency of the arm is to fall into a vertical position.

$E^5$ is a bracket projecting toward the wheel H from the standard $E^3$ or the head E'.

$I^3$ is a short arm rising from the arm I near its pivot upon the standard $I^2$. A link $I^4$ is jointed by one end to the upper end of the arm $I^3$ and by the other end to the bracket $E^5$, the length of this link being sufficient to allow the arm I to hang in a vertical or nearly vertical position, while the wheel H is at right angles to the tail-vane. Then said wheel and the spindle $E^2$, head E', and tube E cannot turn with reference to the tail-vane without drawing the arm I toward or into the horizontal position, whereby, of course, the resistance of said weighted arm is augmented. The upper end of said lever I extends beyond its pivot sufficiently to reach to or nearly to the opening of the upper end of the tube E, when said arm is drawn into the horizontal position. The wire or cord G' is secured to said upper end of the arm I and extends down through the tube E to the ground. Drawing said cord from below draws the arm I into the horizontal position and throws the short arm $I^3$ forward, thereby causing the latter to push the link $I^4$ and wheel H around toward the tail-vane and out of the wind. Thereafter releasing said cord leaves the arm I free to draw the wheel back into the wind if the latter is not so strong as to hold the wheel out.

The standard $I^2$ is secured to the turn-table in a novel manner. Heretofore the turn-table has had cast upon it a lateral extension having a vertical socket to receive the lower end of said standard. Said socket had to be formed by casting. This was necessary for economy and because the shape of the turn-table made it difficult to drill such socket. In casting, a core was used for forming the socket, and in pouring said core would always be displaced more or less, so that the socket would not stand in its correct position. If one end of the core was moved a little, the upper end of the standard was thrown considerably out of line, so that the proper relation of the weighted arm to the other parts of the mill was destroyed and the mill rendered defective. To cause all the mills to work satisfactorily, it is necessary that all the parts be spaced correctly and uniformly. By my mode of securing said standard it must always stand in the same position in duplicates of the mill; hence no attention need be given to the adjustment of parts after the proper proportions for one mill have been worked out. $B^6$ is the extension to which said standard is secured. Said extension is preferably flat and is in a vertical plane, and the lower end of the standard $I^2$ is also preferably flattened, and is provided with a suitable lateral recess $i$, so that it will lie against the side and the flange $i^2$, bordering the depression I, fitting over the edges of the extension $B^6$. Thus the metal of the standard will engage each edge of the extension $B^6$ and be held thereby from moving downwardly in a vertical line or turning outwardly at its upper end. A bolt $b^6$, extending transversely through the extension $B^6$ and the lower end of the standard $I^2$, binds said parts together; but said bolt supports little or none of the weight of the standard $I^2$, and is subjected to little or no shearing strain. So long as said parts are properly held together by the bolt the strain resulting from the weight above is exerted upon said parts. The longitudinal strain upon said bolt may also be largely removed by forming a channel $b$ in the turn-table along the inner edge of the extension $B^6$ at the side to which the standard $I^2$ is applied and of proper width to allow the edge of the standard to fit into the same snugly. The metal at the sides of said channel then holds the inner edge of said standard from turning laterally, thus making it easy for the bolt $b^6$ to hold the entire standard from twisting or turning laterally. Said extension $B^6$ may be channeled to receive the flattened lower end of the standard $I^2$, the result being the same. In casting said turn-table and said standard no cores need be used, and no special care need be exercised, and all the castings turned out are uniformly according to the patterns.

Another feature of my improvement relates to the pump-rod G. This is jointed in order that the upper end of the said rod may turn with the wind-wheel, while the lower end is held from turning. Heretofore a tubular casting having a neck at one end has been fitted over one section of the pump-rod, the neck being directed toward the other section of the pump-rod, and another casting having at its end toward the first casting one-half of a collar to fit said neck was fitted to the other section of the pump-rod. Another half of a collar was then so bolted upon the first that the two would encircle the neck. In practice this construction has always proven more or less defective, the parts becoming loosened under the long-continued alternating strain to which they are subjected.

In the drawings, $G^3$ designates the upper casting of the joint. This has a longitudinal rectangular socket $G^4$ for receiving the upper section of the pump-rod, and at the side of said socket $G^4$ a longitudinal bore $G^5$, through which the cord $G'$ extends. Said pump-rod is secured by set-bolt or otherwise. At the lower end of said casting there is formed a round neck $G^6$. $G^7$ is the lower casting of the joint. This is suitably secured to the upper end of the lower section of the pump-rod, and has at its upper end the transverse collar $G^8$, surrounding the neck $G^6$. Said part $G^7$ and the collar $G^8$ are a single casting. In part the casting $G^3$ is cast separately. This is then laid into the mold in which the part $G^7$ is to be formed in such manner as to make the surface of the neck $G^6$ a part of the interior walls of the mold. The mold is then filled with metal. This results in casting the part $G^7$ upon the part $G^3$, the solid collar fitting closely upon the neck $G^6$, and the meeting surfaces being hardened during the process of casting. As said collar and part $G^7$ are a single piece, they will remain firm with reference to each other unless they break, and since said collar fits so closely upon said neck and their meeting surfaces are hardened they remain firm for an indefinite period of time. The part $G^7$ may also be cast first and then put into the mold for casting the part $G^3$.

I claim as my invention—

1. In a windmill, the combination, with the tower, the turn-table, the tail-vane, and the wheel-tube, head, and wheel, of an extension $B^6$, extending upward from said turn-table in a vertical plane and having a vertical plane at right angles to the tail-vane, a channel $b$, formed in the turn-table along the border of said face of the extension $B^6$, a standard $I^2$, applied to said vertical face of the extension $B^6$, and a weighted lever I, pivoted to the upper end of said standard and suitably joined to said wheel-head or some part supported thereby, said extension $B^6$ and the lower end of said standard $I^2$ being fitted into each other laterally, a flange, as $i^2$, extending laterally from one side of said parts over the edges of the other and resisting the downward movement of the upper end of the standard $I^2$, said parts being held so fitted together by a bolt $b^6$, extending horizontally through the same, and the edge of said standard $I^2$ adjacent to said turn-table being extended into said channel $b$, whereby said standard is in a measure held against lateral movement upon said extension $B^6$, substantially as shown and described.

2. In a windmill, the combination of the tower, the cap at the top of said tower, the turn-table having a tube extending downward through said cap and into said tower, a ring surrounding said tube near its lower end and supported by the tower, a wheel-tube resting within the tube of the turn-table and extending nearly to the lower end of the latter, a tubular plug fitted into the lower end of said wheel-tube and secured thereto by a screw and having at a short distance below said tube an annular hip, a ring surrounding the lower end of the turn-table and resting against the ring supported by the tower, and a bolt extending through one side of said lower ring, one side of the turn-table tube, and into the space above the annular hip and the lower end of said plug, substantially as shown and described.

In testimony whereof I affix my signature in presence of two witnesses.

FRANK T. ZIMMERMAN.

Witnesses:
ALBERT ROBBINS,
W. H. McQUISTON.